US012258803B2

(12) United States Patent
Gerstmayr et al.

(10) Patent No.: US 12,258,803 B2

(45) Date of Patent: Mar. 25, 2025

(54) HINGE ELEMENT FOR A LARGE DOMESTIC APPLIANCE AND LARGE DOMESTIC APPLIANCE

(71) Applicant: BSH Hausgeräte GmbH, Munich (DE)

(72) Inventors: Florian Gerstmayr, Gundelfingen (DE); Johannes Köpf, Amstetten (DE); Christian Schmid, Neu-Ulm (DE); Helmut Steichele, Lauingen (DE)

(73) Assignee: BSH Hausgeräte GmbH, Munich (DE)

(*) Notice: Subject to any disclaimer, the term of this patent is extended or adjusted under 35 U.S.C. 154(b) by 0 days.

(21) Appl. No.: 18/044,417

(22) PCT Filed: Nov. 10, 2021

(86) PCT No.: PCT/EP2021/081225

§ 371 (c)(1),
(2) Date: Mar. 8, 2023

(87) PCT Pub. No.: WO2022/112000

PCT Pub. Date: Jun. 2, 2022

(65) Prior Publication Data

US 2023/0358083 A1 Nov. 9, 2023

(30) Foreign Application Priority Data

Nov. 24, 2020 (DE) ..................... 10 2020 214 710.8

(51) Int. Cl.
*E05D 5/14* (2006.01)
*E05D 3/02* (2006.01)
(Continued)

(52) U.S. Cl.
CPC ................. *E05D 3/12* (2013.01); *E05D 3/02* (2013.01); *E05D 5/14* (2013.01);
(Continued)

(58) Field of Classification Search
CPC .... E05D 3/02; E05D 3/12; E05D 5/14; E05D 2005/104; E05D 2005/106; E05D 3/06;
(Continued)

(56) References Cited

U.S. PATENT DOCUMENTS

| | | | | |
|---|---|---|---|---|
| 2,701,384 A * | 2/1955 | Barroero | F25D 23/028 16/378 |
| 4,090,274 A * | 5/1978 | Bourgeois | E05F 1/063 16/317 |

(Continued)

FOREIGN PATENT DOCUMENTS

| | | |
|---|---|---|
| CN | 202055662 U | 11/2011 |
| DE | 20213473 U1 | 6/2003 |

(Continued)

*Primary Examiner* — Jeffrey O'Brien

(74) *Attorney, Agent, or Firm* — Laurence A. Greenberg; Werner H. Stemer; Ralph E. Locher

(57) ABSTRACT

A hinge element for a large domestic appliance contains a main body as well as a functional body which includes a plastic material. Accordingly, the main body and the functional body are connected to one another non-releasably. Ideally, a large domestic appliance, in particular a large domestic refrigerator, contains a housing in which a receiving space is formed. The domestic appliance has a closure element by which the receiving space can be closed, and the hinge element hingedly attaches the closure element to the housing.

12 Claims, 4 Drawing Sheets

(51) Int. Cl.
*E05D 3/12* (2006.01)
*E05D 5/10* (2006.01)

(52) U.S. Cl.
CPC ... *E05D 2005/104* (2013.01); *E05Y 2800/676* (2013.01); *E05Y 2900/31* (2013.01)

(58) Field of Classification Search
CPC ..... E05D 7/08; E05D 7/081; E05Y 2800/676; E05Y 2900/31
See application file for complete search history.

(56) References Cited

U.S. PATENT DOCUMENTS

| | | | | | |
|---|---|---|---|---|---|
| 5,020,189 | A * | 6/1991 | Grome | E05F 1/1253 16/72 |
| 5,187,837 | A * | 2/1993 | Gunderson | F25D 23/028 16/386 |
| D396,402 | S * | 7/1998 | Rastovski | D8/354 |
| 5,787,724 | A * | 8/1998 | Pohl | F25D 23/028 312/401 |
| 5,884,366 | A * | 3/1999 | Jeong | E05D 7/081 16/268 |
| 5,975,663 | A * | 11/1999 | Becker | F25D 23/028 16/374 |
| 6,030,064 | A * | 2/2000 | Kim | F25D 23/028 312/405 |
| 6,434,792 | B1 * | 8/2002 | Williamson | E05D 9/00 16/268 |
| 7,065,832 | B2 * | 6/2006 | Pohl | E05D 7/081 16/221 |
| 7,615,713 | B2 * | 11/2009 | Bardella | B60R 16/0215 174/152 G |
| 7,621,022 | B2 * | 11/2009 | Gandevia | E05D 7/081 16/385 |
| 7,685,678 | B2 * | 3/2010 | Moon | F25D 23/028 16/245 |
| 8,166,611 | B2 * | 5/2012 | Moon | F25D 23/028 16/250 |
| 8,281,420 | B2 * | 10/2012 | Hand | A47K 13/12 4/240 |
| 8,562,057 | B1 * | 10/2013 | Schlater | B60R 7/04 16/335 |
| 8,635,743 | B2 * | 1/2014 | Smith | F16C 11/045 16/382 |
| 9,556,657 | B2 * | 1/2017 | Yi | E05D 5/04 |
| 10,260,261 | B2 * | 4/2019 | Reuter | E05D 7/0415 |
| 10,451,332 | B2 * | 10/2019 | Yi | E05D 7/081 |
| 10,501,971 | B2 * | 12/2019 | Zhang | E05D 3/02 |
| 10,598,424 | B2 * | 3/2020 | Dherde | E05D 15/266 |
| 11,002,048 | B2 * | 5/2021 | Nakamura | E05D 3/04 |
| 2006/0143860 | A1 * | 7/2006 | Park | F25D 23/028 16/243 |
| 2007/0234517 | A1 * | 10/2007 | Larson | E05D 11/087 16/342 |
| 2010/0026155 | A1 * | 2/2010 | Yun | E05D 7/081 312/405 |
| 2012/0023704 | A1 * | 2/2012 | Case | G06F 1/1681 16/337 |
| 2015/0354259 | A1 * | 12/2015 | Broadhead | E05C 17/203 16/82 |
| 2020/0271372 | A1 * | 8/2020 | Fei | E05F 3/104 |
| 2020/0308887 | A1 * | 10/2020 | Raab | E05D 3/02 |
| 2021/0062561 | A1 * | 3/2021 | Pavnick | E05D 7/12 |
| 2023/0323715 | A1 * | 10/2023 | Favero Gomes | E05D 11/0054 16/221 |
| 2024/0044570 | A1 * | 2/2024 | Dong | E05F 3/20 |

FOREIGN PATENT DOCUMENTS

| | | | |
|---|---|---|---|
| DE | 102008043811 | A1 | 5/2010 |
| EP | 2281095 | A1 | 2/2011 |
| WO | 2009132946 | A1 | 11/2009 |

* cited by examiner

HINGE ELEMENT FOR A LARGE DOMESTIC APPLIANCE AND LARGE DOMESTIC APPLIANCE

FIELD AND BACKGROUND OF THE INVENTION

The invention relates to a hinge element for a large household appliance, comprising a main body as well as a functional body having a plastics material.

Large household appliances typically have a receiving space arranged in a carcass and a door arranged on the carcass for opening or closing the receiving space. Examples of large household appliances of this type are refrigeration appliances (refrigerators, upright freezers, chest freezers, wine refrigerators, fridge-freezer combinations), dishwashers, cooking appliances or washing machines. It is known here to use a hinge element for rotatably mounting the door, said hinge element have a main body typically fastened to the carcass. It is known to provide this hinge element with a functional body having a plastics material. The functional body here typically forms a bearing pin, which is received in a corresponding bearing bush of the door.

EP2281095A1 discloses a hinge element for a door of a household appliance, wherein the hinge element has an assembly section for assembly on a carcass of the household appliance, a support arm projecting from the assembly section and bearing elements arranged on free ends of the support arm, wherein at least one of the two bearing studs of the hinge element is received in a torque-proof manner in a bearing pin consisting of a plastics material, which is mounted in a bearing lug fixed to the door.

SUMMARY OF THE INVENTION

The object of the present invention is to provide a hinge element which has improved precision compared with the known hinge elements and can still be manufactured easily and cost-effectively. The object is further to provide a large household appliance which, compared with the known large household appliances, provides a more precise connection between the door and the carcass and in the process can be manufactured easily and cost-effectively.

This object is achieved according to the independent claims.

The invention is based here on a hinge element for a large household appliance, i.e. a large household appliance hinge element. Hinge elements of this type are characterized in that these withstand the high force effects over a long service life as a result of their dimensioning on the one hand and as a result of the materials used on the other hand. Therefore, hinge elements of this type must withstand weight forces of a closure element of up to 70 kg over 200,000 opening cycles, without visibly negatively impacting the function.

The hinge element is used here to attach, i.e. rotatably fasten, a closure element of a large household appliance to a carcass of the large household appliance. The closure element can be in particular a door or a flap, which, arranged on the outside of the carcass, closes a receiving space (for instance for food).

On the one hand the hinge element comprises a main body and on the other hand it comprises a functional body. The main body, in particular embodied as an inherently rigid component, preferably forms a main element of the hinge element and is used to securely and reliably transfer the forces acting on the hinge element between the closure element and the carcass (in particular without a deformation of the hinge element negatively impacting the function). The functional body by contrast represents an additional element of the hinge element, which enables at least one function which is required for the hinge element (e.g. providing a sliding surface, providing a supporting surface, providing a stop). The main body and the functional body have different materials or are manufactured from different materials.

In accordance with the invention, provision is made for the main body and the functional body to be non-detachably connected to one another. A non-detachable connection is understood here to mean connections which no longer enable a disassembly or separation or detachment of the main body and the functional body from one another except by destroying the main body and/or the functional body and/or a connecting agent (e.g. adhesive) located therebetween. The non-detachable connection therefore forms a nondestructive non-detachable or not nondestructive detachable connection.

The present invention is based here on the knowledge that a very precise positioning of the functional body with respect to the main body is made possible by means of the non-detachable connection. Therefore, distances or angles between specific points or surfaces, which lie on the one hand on the main body and on the other hand on the functional body, can be fixed or defined precisely during manufacture of the bearing element. Therefore, a very precisely operating bearing element can be provided for instance by means of the precise determination of distances or angles between a contact surface on the main body for making contact between the bearing element and a carcass on the one hand and functional surfaces embodied on the functional body for providing a sliding surface on the other hand, for instance.

This non-detachable connection moreover makes it possible for this high precision also to be retained over a long usage time. Contrary to a known bearing element, which has a separate bearing pin attached to a stud of the main body, the non-detachable connection also prevents minimal movements between the main body and the functional body during operation. Wear and tear in the region of the connection between the main body and the functional body can be prevented. If the functional body forms a bearing pin, for instance, an unwanted turning of the bearing pin with respect to the main body can also be prevented.

Moreover, the production of large household appliances is simplified with an inventive hinge element since the hinge element can be more easily handled or assembled as a single-piece component. Since there is no need to attach a separate functional body as an additional work step, the risk of incorrectly joining the main body and the functional body is ruled out. The non-detachable connection also rules out unintentionally releasing the functional body from the main body during manufacture of the large household appliance.

When a door stop is replaced at a later point in time, in particular by means of an end consumer, during which the hinge element detaches from the carcass and has to be refastened to an opposite side of the carcass, the risk of the functional body unintentionally detaching from the main body is likewise ruled out. There is therefore also no possibility of attaching a detached functional body incorrectly to the main body.

Embodiments of the invention are specified in the dependent claims.

The non-detachable connection between the main body and the functional body can take place for instance by means of a material-bonded connection between the main body and the functional body. Therefore, provision is made according to one embodiment for the main body and the functional body to be glued to one another. Spray adhesive or liquid adhesive can be used here as adhesive, for instance. It is conceivable here for the functional body having the plastics material to be glued directly to or on the e.g. metallic main body. It is likewise conceivable for the functional body to be formed by two preassembly components which are embodied separately from one another and having plastics material in each case and which are glued directly to one another (e.g. an upper and a lower half as two preassembly components). Combinations of both variants are likewise conceivable.

In accordance with one embodiment, it is provided that the functional body be formed by a coating of the main body. In particular, if the functional body embodies a bearing pin, the coating can be formed by a sliding layer. The coating can be sprayed for instance and/or have a layer thickness of less than 1 mm.

It is likewise conceivable for the non-detachable connection between the main body and the functional body to take place by means of a form-fit connection between the main body and the functional body.

According to one embodiment, provision is made for the functional body to be formed by injection molding the main body, in particular at least in sections or for the functional body to be molded on the main body, in particular at least in sections. The non-detachable connection between the main body and the functional body is therefore generated by a plastic injection molding method. Here the main body can be inserted into an injection molding tool and either injection molded completely or in sections by the plastics material of the functional body. In this way, a particularly precise geometry of the hinge element or precise positioning of the functional body compared with the main body can be achieved. Here the position of the main body within the injection molding tool can be accurately fixed by a corresponding bracket, so that the molded functional body has a defined position with respect to the main body with high repetition accuracy.

According to one embodiment, provision is made for the functional body to cover or coat the main body completely. The main body is therefore completely enclosed by the functional body, in particular the main body has no exposed external surfaces.

According to an alternative embodiment, provision is made for the functional body to cover or coat the main body only in sections. The main body therefore has exposed external surfaces on the one hand and surfaces covered by the functional body on the other hand. By comparison with a complete coverage or coating of the main body by the functional body, this embodiment makes possible a more cost-effective manufacture, since less plastics material is required to generate the functional body. Moreover, the exposed external surfaces can be used or embodied for fastening on the carcass of the large household appliance. Therefore in the exposed external surfaces of the main body, fastening openings can be provided for screws so that in order to fasten the hinge element to the carcass, screws can make direct contact with the main body in order to enable a direct force transmission.

According to one embodiment, provision is made for the functional body to have at least one functional surface. The functional surface represents a surface which is or can be in contact with the closure element, in particular a surface which contributes or may contribute to positioning the closure element with respect to the carcass and/or a surface which serves or may serve as a guide surface when the closure element is pivoted with respect to the carcass and/or a surface which contributes or may contribute directly to transmitting force between the closure element and the carcass (i.e. makes contact with at least the closure element or the carcass). If two, three or more functional surfaces are formed by one and the same functional body, these can be embodied together or separately from one another. The embodiment of more than one functional surface on one and the same functional body results in the functional body being able to be embodied more solidly. The individual functional surfaces can therefore be embodied larger so that their respective seating presses are reduced with a force effect. Overall, higher forces can therefore act on the functional surfaces.

According to one embodiment, provision is made for the functional surface to form a sliding surface and/or a stop surface and/or a guide surface. The sliding surface interacts in particular with a further sliding surface during the movement of the closure element, said further sliding surface being embodied on the closure element. The sliding surface can be formed for instance by an external lateral area of a bearing pin formed by the functional body. The sliding surface can alternatively or in addition be formed by a circular ring surface, in particular a circular ring surface adjoining said external lateral area and extending radially outward herefrom. The stop surface can be formed in particular by a surface which is aligned parallel to a pivot axis and/or is flat and serves to restrict a maximum opening angle of the closure element. For this purpose a further stop surface is provided on the closure element, which, when the opening angle is at a maximum, makes contact with the stop surface of the functional element. The guide surface can interact in particular with a further guide surface embodied on the closure element, in order to benefit an automatic closure of the closure element from a minimal opening angle. For this purpose, the further guide surface can be embodied on a spring arm of a closure element, wherein the closure element is arranged on the closure element. The guide surface can be embodied parallel to the pivot axis. On account of the precise arrangement of the functional body compared with the main body, a precise guidance of the closure element during its movement, a precise end stop with a predetermined maximum door opening angle and a reliable drawing-in of the closure element from a minimal door opening angle are therefore enabled.

According to one embodiment, provision is made for the functional body to form a bearing pin and/or a door stop and/or a door closer. The bearing pin can be formed in particular completely and/or exclusively by the functional body. The bearing pin can interact with a bearing bush, which is embodied in particular completely and/or exclusively on the closure element. In particular, no further components are required for the rotatable mounting of the closure element with respect to the carcass. With a hinge element mounted in a large household appliance, the bearing pin immerses here in the bearing bush. The bearing bush can be embodied for instance on a closure strip of the closure element, in particular in one piece, for instance by means of a blind hole. The bearing pin preferably has a circular ring-shaped external lateral area as a functional surface (sliding surface). However, it is conceivable for the bearing pin to be embodied to be solid, e.g. in the form of a solid cylinder. According to one embodiment, provision is however made for the bearing pin to be formed substantially or completely by a hollow cylinder, wherein reinforcing ribs preferably molded on the interior of its internal lateral area are embodied. In this way the material use can be further reduced. Furthermore, there is a lower risk of sinking spots, on account of material accumulations, during the manufacture of the functional body by means of a plastic injection molding method. A more uniform functional surface on the external lateral area of the bearing pin can therefore be generated. The door stop can be formed by a material accumulation of the functional body. The door stop preferably forms a planar surface which can be oriented in particular parallel to the pivot axis. The door stop interacts with a stop body, which is arranged on the closure element, in the case of a maximum opening angle and thus limits the maximum opening angle of the closure element. The stop body can likewise be embodied in one piece on a closure strip of the closure element or be fastened hereto. The door closer can likewise be formed by a material accumulation of the functional body, for instance a door closing cam. The door closer can embody in particular a curved functional surface. The door closer interacts in particular with a spring element embodied on the closure element or fastened to the closure element, in which this engages with the spring element in the case of a minimum opening angle of the closure element. Closing forces acting on the closure element are produced in the process. If the functional body is injection molded to the main body by means of an injection molding method, a sufficiently large material accumulation can be produced in particular for the door stop and the door closer. Compared with conventional elements mounted as one or more separate components, a more stable and longer-lasting construction is made possible.

According to one embodiment, provision is made for the main body to have a reinforcing projection covered by the bearing bush and/or the door stop and/or the door closer. The main body has in particular projections which extend in the bearing bush and/or the door stop and/or the door closer and thus increase their stability again further. The reinforcing projections or extensions are preferably covered or included here completely by the functional body. In particular, if the functional body is molded to the main body by an injection molding method, these reinforcing projections may have geometries which can be selected optimally for increasing the stability. Therefore, an undercut can be embodied on a reinforcing projection, for instance, which would remain as free space during the assembly of a conventional, attached functional body. Within the scope of an injection molding method, it is however possible also to close the undercut by means of the functional body, so that the resistance of the hinge element can be increased again.

According to one embodiment, provision is made for the main body to have an in particular exposed fastening section. The fastening section is embodied for assembling the hinge element on the carcass of the large household appliance. Here the fastening section can have (thread-free through openings for instance) for one, two or more fastening openings. The fastening section has a preferably planar contact surface, which, when the hinge element is assembled, rests in planar manner against a surface, in particular end face, of the carcass. It is conceivable for the complete fastening section to be covered by the functional body. In this way, it is possible to avoid damaging the surface of the carcass by means of the functional body consisting of plastics material. It is likewise conceivable for the fastening section to be embodied to be exposed completely or at least in sections. Exposed is to be understood here to mean that the corresponding section of the fastening section is not covered by the functional body, but instead represents an external surface. In this way, a direct force transmission can take place between a fastening element, for instance a screw, and the fastening section. It is conceivable for instance that the fastening section has exposed fastening openings, but has a contact surface covered by the functional body.

Provision is preferably made for the main body to have a different material or to consist of a different material to the functional body. In particular, provision is made for the main body to have a material with a higher rigidity or consist of a material with a higher rigidity than the functional body. Therefore, the material of the main body could be for instance a plastic with a higher rigidity compared with the plastics material of the functional body. According to one embodiment, provision is however made for the main body to have metal or consist of metal. In this way, typically in the case of large household appliances the main body can receive the forces acting on the hinge element also over a long usage period.

According to one embodiment, provision is made for the main body to be embodied in one piece. The main body is therefore manufactured from a single component. If the main body consists of metal, the main body can be in particular a punched-bent part or a metal injection molding component.

The material used for the functional body can be selected in respect of the functions provided thereby. Therefore provision is made according to one embodiment for the functional body to have PA6 or POM or consist of PA6 or POM. These plastics have good sliding properties.

According to one embodiment, provision is made for the functional body to be embodied in one piece. The functional body is therefore manufactured from a single component (for instance injection molding). In particular, the functional body can be embodied with one material, i.e. have a homogeneous material structure.

It is basically conceivable for a single, cohesive functional body to be non-detachably fastened to the main body. All functional surfaces of the functional body are embodied here on the individual functional body.

It is likewise conceivable for a functional body having further plastics material to be non-detachably fastened to the base body or non-detachably connected hereto. The functional body and the further functional body can here be distanced in particular from one another, i.e. in particular embodied separately from one another and have no direct contact with one another. It is conceivable here for the non-detachable connection of the two functional bodies with the main body to be based on different connection types or for the same connection type to exist. It is conceivable for instance for the functional body and the further functional body to be injection molded to the main body. The features described in respect of the inventive functional body can likewise be applied with the further functional body.

It is likewise possible for an additional functional element to be fastened, in particular non-detachably fastened, to the hinge element by means of a form-fit and/or force-fit connection, in addition to the functional body connected non-detachably with the main body. The additional functional element can form a door stop or a door closer, for instance.

An inventive large household appliance comprises a carcass, in which a receiving compartment (for items to be cooled) is formed, a closure element, with which the receiving space of the carcass can be closed, and an inventive hinge element, with which the closure element is attached to the carcass by way of hinges.

An exemplary embodiment of the present invention will be explained with reference to the attached figures, in which:

DETAILED DESCRIPTION OF THE INVENTION

Figure 1:
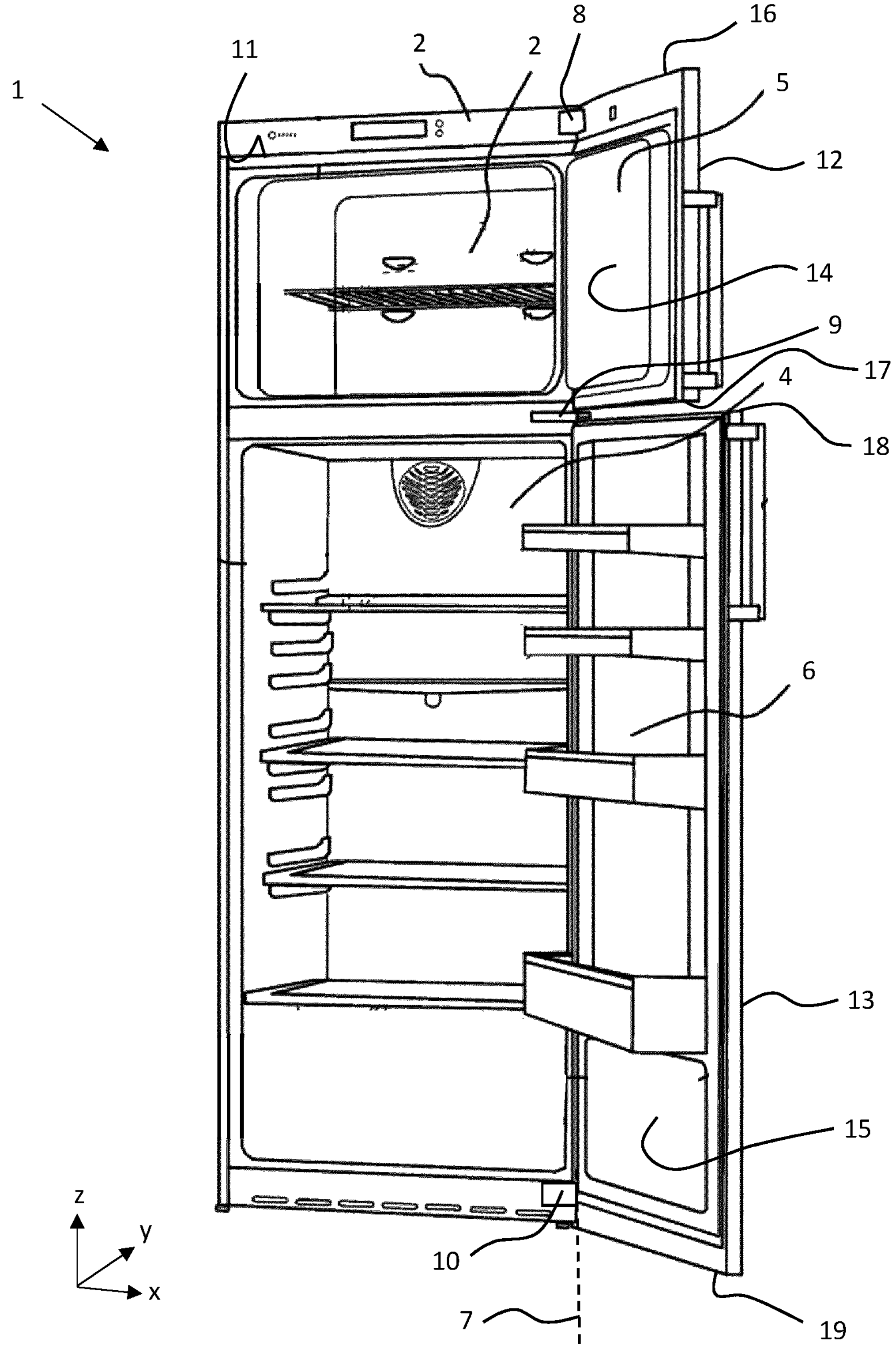
FIG. 1 shows a large household appliance according to the invention.

Elements which are identical or have the same effect are provided with the same reference characters in the figures.

FIG. 1 shows a large household appliance 1 in the form of a fridge-freezer combination. The large household appliance 1 comprises a carcass 2, which has a first receiving space 3 and a second receiving space 4 for receiving goods to be chilled. The two receiving spaces 3, 4 can be closed by two separate closure elements 5, 6. The closure elements 5, 6 are formed by doors which are mounted rotatably about a vertical pivot axis 7. Each closure element 5, 6 is attached here to the carcass by 2 vertically distanced hinge elements. Therefore, the first closure element 5 is attached to the carcass 2 by way of an upper hinge element 8 and by way of a middle hinge element 9. The second closure element 6 is attached to the carcass by way of the middle hinge element 9 and a lower hinger element 10. The hinge elements 8, 9, 10 are fastened on an end face 11 of the carcass 2. The hinge elements 8, 9, 10 have bearing pins, which engage in corresponding bearing bushes of the closure elements 5, 6. The upper hinge element 8 has a downwardly directed bearing pin and the lower hinge element 10 has an upwardly directed bearing pin. The middle hinge element 9 has both an upwardly directed bearing pin (for engagement into a bearing bush of the first closure element 5) and a downwardly directed bearing pin (for engagement into the second closure element 6). The closure elements 5, 6 have in each case external walls 12, 13 and internal walls 14, 15, which bound a cavity filled with thermal insulation material. These cavities are closed by closure strips 16, 17, 18, 19 on upper or lower edge sections of the closure elements 5, 6. In the closure strips 16-19 formed from plastic, the bearing bushes are embodied in one piece as blind holes. The bearing pins of the hinge elements 8, 9, 10 engage directly into the bearing bushes without further elements or components.

Figure 2:
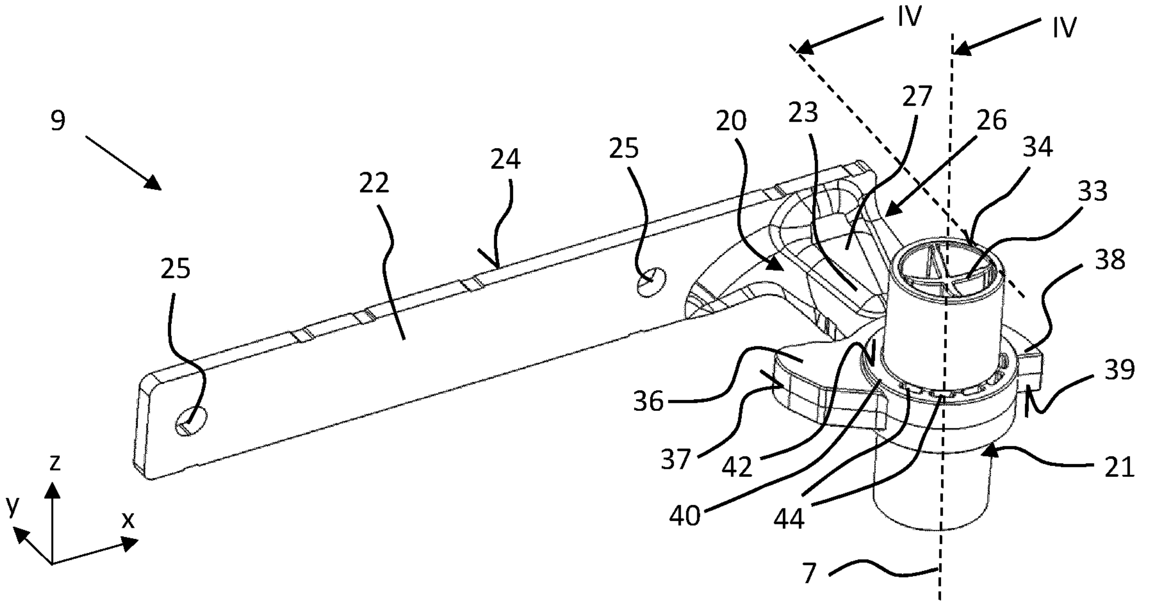
FIG. 2 shows a view of a hinge element according to the invention.
Figure 3:
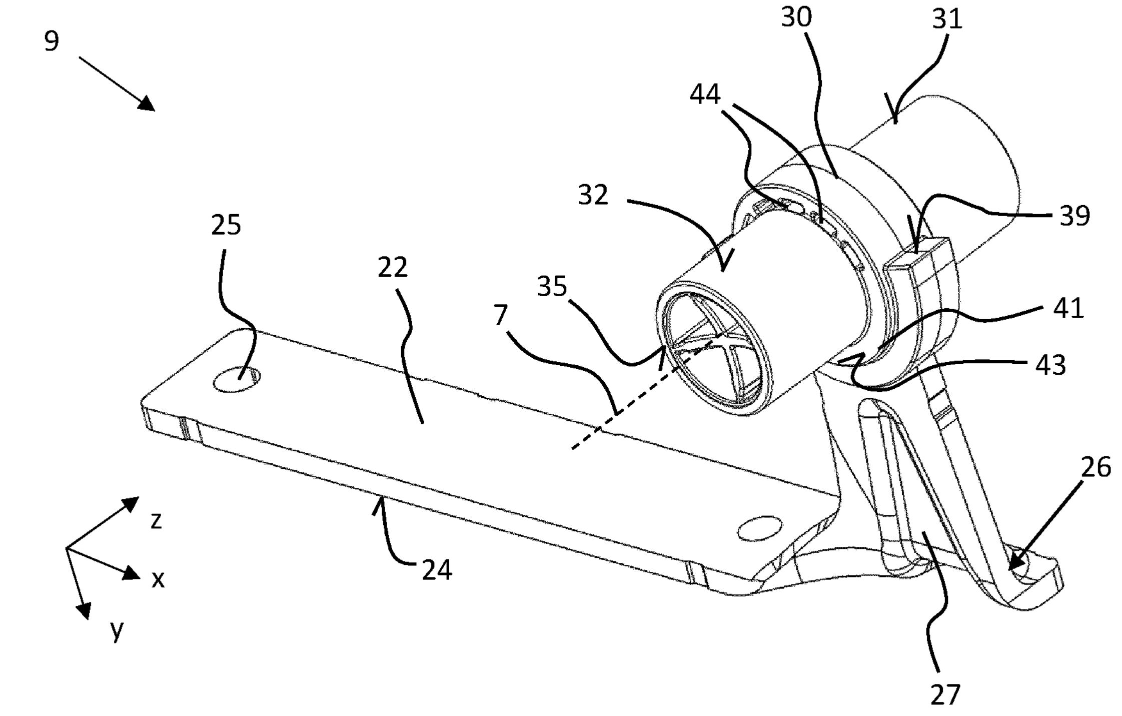
FIG. 3 shows a further view of the hinge element according to the invention from FIG. 2.

The middle hinge element 9 is shown from different viewing angles in FIGS. 2 and 3. The hinge element 9 consists exclusively of a main body 20 and a functional body 21 which is non-detachably fastened thereto. In the present exemplary embodiment, the functional body 21 is injection molded to the main body 20.

The main body 20 consisting of metal comprises a fastening section 22 and a bearing arm 23. The bearing arm 23 extends here essentially at right angles to a main extension plane of the fastening section 22 and projects forwards (counter to the depth direction y) with respect to the end face 11. The fastening section 22 is embodied for fastening to the carcass 2 and herefor has on the one hand a planar contact surface 24 and on the other hand two fastening openings 25. The contact surface 24 is facing away from the bearing arm 23. The bearing arm 23 has a first end section 26, by means of which it is connected to the fastening section 22. The main body 20 has a reinforcing structure formed in the shape of a bead 27. This extends beyond the first end section 26 into the bearing arm 23 starting from the fastening section 22. The bead 27 ends contrary to the depth direction Y in front of the functional body 21.

The functional body 21 consisting completely of plastic has two bearing pins 28, 20. The two bearing pins 28, 29 extend starting from a middle section 30 vertically in opposite directions along the height axis Z. The upper bearing pin 28 is used to engage in a bearing bush of the lower door closure strip 17 of the first closure element 5. The lower bearing pin 29 is used to engage in a bearing bush of the upper door closure strip 18 of the second closure element 6. The two bearing pins 28, 29 each have a cylindrical design with a circular ring-shaped external lateral area. The external lateral areas form functional surfaces 31, 32, which are used as sliding surfaces for engagement in circular ring-shaped inner lateral areas of the bearing bushes. The two bearing pins 28, 29 are embodied as hollow cylinders at least in sections (starting from their free end sections). Reinforcing ribs 33 are molded in one piece in the cavity restricted by their inner lateral areas. The reinforcing ribs 33 extend here starting from the inner lateral area in the direction of the center, i.e. in the direction of the pivot axis 7. At the free ends of the bearing pins 28, 29 these have circular ring-shaped end surfaces 34, 35. The end surfaces 34, 35 lie in a horizontal plane (a plane comprising the width direction x and the depth direction y). The reinforcing ribs 33 are withdrawn or embodied concave with respect to the end surfaces 34, 35, in order not to represent any interference contours for the bearing bushes of the closure elements 5, 6.

The functional body 21 further has a door closer 36. The door closer 36 has a curved functional surface 37 which is embodied parallel to the pivot axis 7. The door closure 36 forms a material accumulation of the functional body 21, in particular in the form of a closing cam and can interact with a spring element which is embodied or arranged in particular on the closure strip 18 of the closure element 6. The door closer 36 is arranged on the central section 30.

The functional body 21 furthermore has a door stop 38, which embodies a planar functional surface 39 which is aligned parallel to the pivot axis 7. The functional surface 39 is likewise arranged on the central section 30 and essentially faces the door closer 36 with respect to the pivot axis 7.

The central section 30 of the functional body 21 has two circular ring-shaped shoulders 40, 41. The shoulders 40, 41 directly adjoin these in the axial direction of the bearing pins 28, 29 and thus lie facing the free end of the bearing pins 28, 29. The shoulders 40, 41 form guide surfaces 42, 43, which represent circular ring-shaped sliding surfaces. Depressions 44 which are used to avoid excessive material accumulations of the functional body 21 are embodied in the shoulders 40, 41 so that its functional surfaces 31, 37, 42, 43 have high precision.

Figure 4:
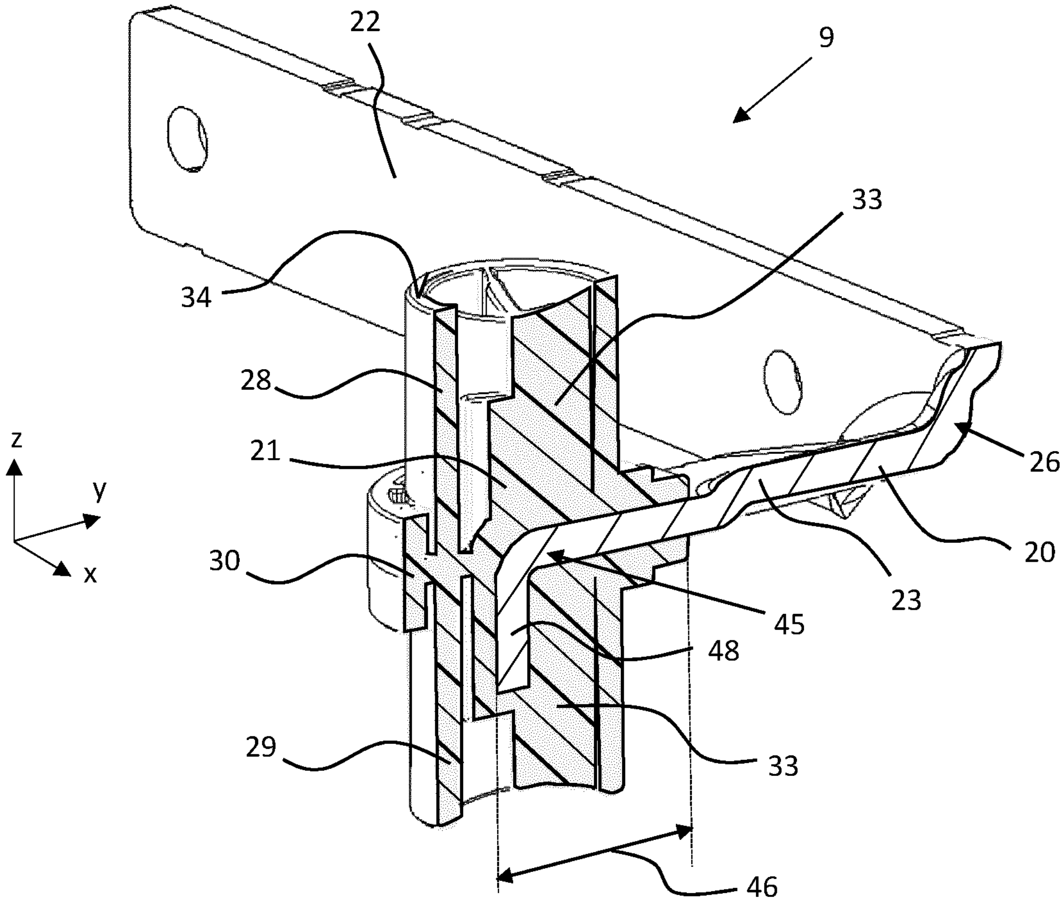
FIG. 4 shows a sectional representation along the sectional plane IV-IV from FIG. 2.

FIG. 4 shows a sectional view of the hinge element 9 along the line of intersection IV-IV in FIG. 2. The bearing arm 23 has a second end section 45, which faces the first end section 26 as a free end section. The second end section 45 is covered completely along a cover section 46 by the functional body 21 measured in the depth direction y. The functional body 21 here encompasses the main body 20 completely as an injection-molded element. In particular, the functional body 21 has no closed cavities filled with air or no closed cavities filled with air are located between the main body 20 and the functional body 21.

Figure 5:
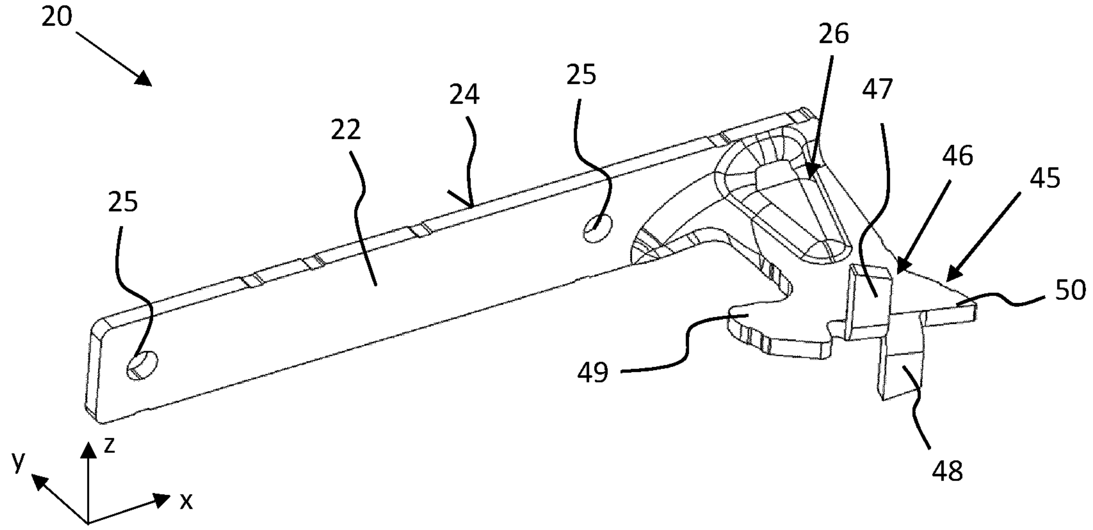
FIG. 5 shows the main body of the hinge element according to the invention from FIG. 2.

As identifiable in particular also with respect to FIG. 5, the bearing arm 23 has two reinforcing projections 47, 48. The reinforcing projections 47, 48 are angled essentially at a right angle away from the bearing arm 23 and therefore run essentially parallel to the pivot axis 7. The reinforcing projections 47, 48 are formed by pins with a rectangular cross-sectional contour and run in the direction of the end surfaces 34, 35 over approximately 50% of the longitudinal extension of the bearing pins 28, 29.

FIG. 5 shows the main body 20 of the inventive hinge element 9 from FIGS. 2 to 4. The punched-bent part shown is the result of a first manufacturing step of the hinge element 9. On the basis of a planar metal blank extending in a plane, this main body 20 is molded into the shape shown in the first manufacturing step. The first manufacturing step can comprise in particular a non-cutting machining (e.g. bending) for generating e.g. the bearing arm 23 or the reinforcing projections 47, 48, a machining (e.g. boring) for generating the fastening openings 25 or a machining (e.g. punching) for generating the external shape. In a subsequent second manufacturing step of the hinge element 9, the functional body 21 is attached to the main body 20 by means of the non-detachable connection. In the present exemplary embodiment, the main body 20 has been placed in an injection molding tool such that only the cover section 46 is injection molded by the plastics material of the functional body 21 and as a result the functional body 21 is embodied.

Since the exact position of the reinforcing projections 47, 48 only has a minimal influence on increasing the stability of the bearing pins 28, 29, the reinforcing projections 47, 48 are arranged eccentrically in each case with respect to the pivot axis 7. In this way, both reinforcing projections 47, 48 can be molded from a single metal blank.

The main body 20 has two further reinforcing projections 49, 50, which are embodied in the region of the door closer 36 or the door stop 38.

Figure 6:
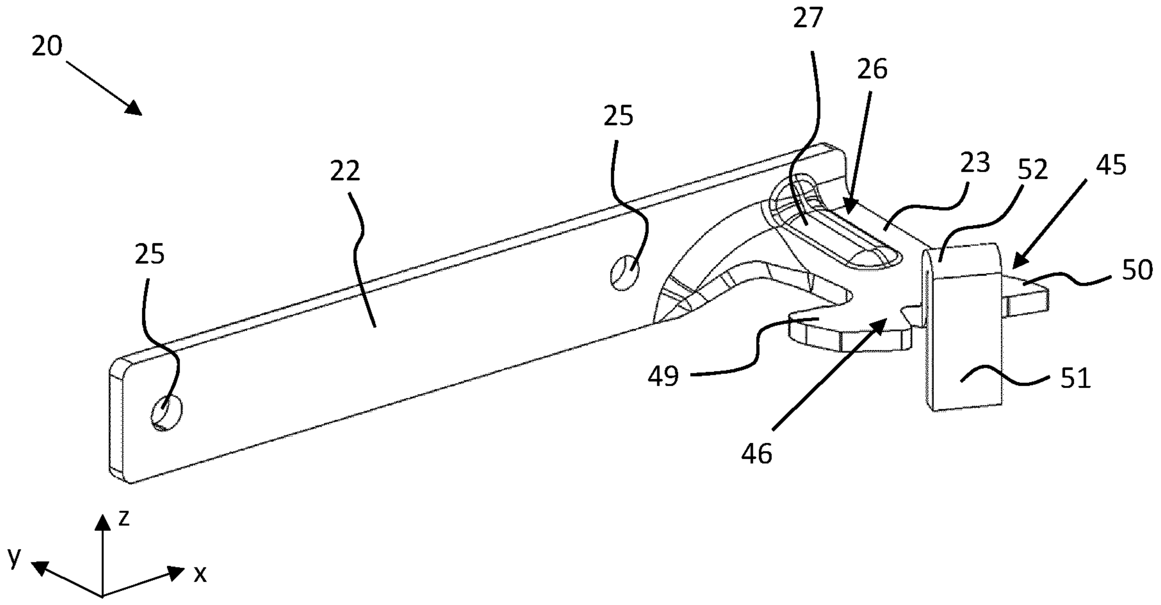
FIG. 6 shows a main body of a hinge element according to the invention according to a second exemplary embodiment and FIG. 7 shows a further representation of the main body from FIG. 6.
Figure 7:
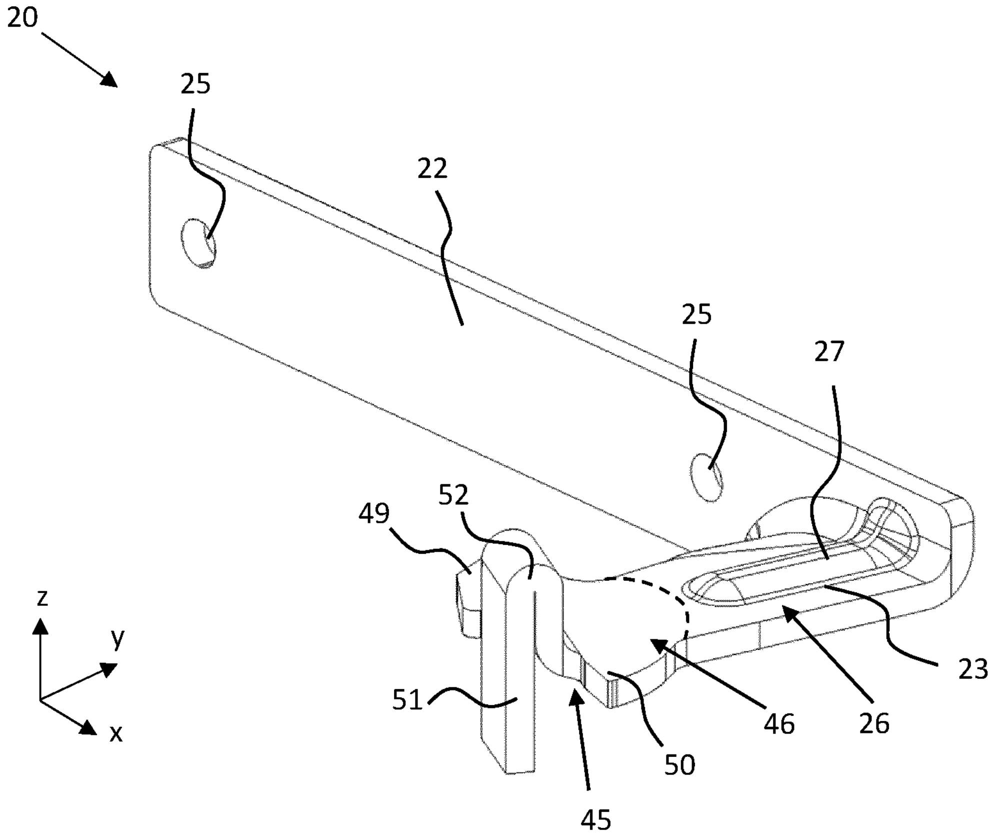

FIGS. 6 and 7 show a main body 20 of an inventive hinge element according to a second exemplary embodiment in two different perspectives. The main body 20 is likewise a metal punched-bent part. The fastening section 22 essentially corresponds to the fastening section 22 of the first exemplary embodiment. The bearing arm 23 likewise has a bead 27.

The second end section 45 of the bearing arm 23 represents a significant difference from the first exemplary embodiment (cf. FIG. 5). Two reinforcing projections 49, 50 are also mounted in one piece here and serve to reinforce the door closer 36 or the door stop 38 formed by the functional body (not shown). However, any reinforcing body 51, which is used to reinforce the bearing pins 28, 29, is formed by a single web. The web extends here starting from a main extension plane of the second end section 45 firstly at right angles, in particular vertically, along a first direction (in particular in the height direction z) and extends from a fold 52 along a second direction which opposes the first direction (in particular against the height direction z). This reinforcing projection 51, which thus serves simultaneously to reinforce the two bearing pins 28, 29, can therefore be measured to be wider (the width is measured here in a plane which lies at right angles to the pivot axis 7). However, a high material usage is required compared with the first exemplary embodiment according to FIG. 5. The stability of the bearing element 9 can however be increased again.

The functional body 21 not shown in FIGS. 6 and 7 can correspond in particular to the functional body 21 of the first exemplary embodiment according to FIGS. 2 to 4. The dashed line here shows the limit of each section, which is injection molded or covered starting from the second end section 45 in the depth direction y by the functional body 21 (cover section 46).

LIST OF REFERENCE CHARACTERS

1 Large household appliance
2 Carcass
3 Receiving space
4 Receiving space
5 Closure element
6 Closure element
7 Pivot axis
8 Hinge element
9 Hinge element
10 Hinge element
11 End face
12 External wall
13 External wall
14 Internal wall
15 Internal wall
16-19 Closure strip
29 Main body
21 Functional body
22 Fastening section
23 Bearing arm
24 Contact surface
25 Fastening opening
26 First end section
27 Bead
28 Bearing pin
29 Bearing pin
30 Central section
31 Functional surface
32 Functional surface
33 Reinforcing rib
34 End surface
35 End surface
36 Door closer
37 Functional surface
38 Door stop
39 Functional surface
40 Shoulder
41 Shoulder
42 Guide surface
43 Guide surface
44 Depression
45 Second end section
46 Cover section
47 Reinforcing projection
48 Reinforcing projection
49 Reinforcing projection
50 Reinforcing projection
51 Reinforcing projection
52 Fold

The invention claimed is:

1. A household refrigeration appliance, comprising:
a housing in which a receiving space is embodied;
a closure element with which said receiving space is closed; and
a hinge element having a main body and a functional body formed from a plastic material, said main body and said functional body are non-detachably connected to one another by said functional body being formed by injection molding said main body to create said functional body on said main body, wherein no closed cavities filled with air are disposed between said main body and said functional body, wherein said functional body forms a bearing pin and/or a door closer and, said closure element being attached to said housing by way of said hinge element.

2. The household refrigeration appliance according to claim 1, wherein said main body has a coating and said functional body is formed by said coating of said main body.

3. The household refrigeration appliance according to claim 1, wherein said functional body covers said main body only in sections.

4. The household refrigeration appliance according to claim 1, wherein said functional body has at least one functional surface.

5. The household refrigeration appliance according to claim 4, wherein said at least one functional surface forms a sliding surface and/or a stop surface and/or a supporting surface.

6. The household refrigeration appliance according to claim 1, wherein said functional body forms said a bearing pin and/or a door stop and/or said door closer.

7. The household refrigeration appliance according to claim 6, wherein said main body has a reinforcing projection covered by said bearing pin and/or said door stop and/or said door closer.

8. The household refrigeration appliance according to claim 1, wherein said main body has an exposed fastening section.

9. The household refrigeration appliance according to claim 1, wherein said main body is formed from metal or consists of said metal.

10. The household refrigeration appliance according to claim 1, wherein said main body is embodied in one piece.

11. The household refrigeration appliance according to claim 1, wherein said functional body is formed from polycaprolactam (PA6) or polyoxymethylene (POM) or consists of said PA6 or said POM.

12. A method for manufacturing a household refrigeration appliance, which comprises the steps of:

producing a housing in which a receiving space is embodied;

providing a closure element with which the receiving space is closed; and producing a hinge element having a main body and a functional body formed from a plastic material, the main body and the functional body are non-detachably connected to one another by the functional body being formed by injection molding the main body to create the functional body on the main body, wherein no closed cavities filled with air are disposed between said main body and said functional body, wherein the functional body forms a bearing pin and/or a door closer and, the closure element being attached to the housing by way of the hinge element.

* * * * *